TAPE ADVANCER FOR AUTOMATIC TELEPHONE DIALER

Filed Aug. 16, 1957 3 Sheets-Sheet 1

INVENTORS
JAMES KILBURG
WILLIAM E. THOMAS
BY
Fryer + Johnson
ATTORNEYS

Sept. 5, 1961 J. KILBURG ET AL 2,999,133

TAPE ADVANCER FOR AUTOMATIC TELEPHONE DIALER

Filed Aug. 16, 1957 3 Sheets-Sheet 2

INVENTORS
JAMES KILBURG
WILLIAM E. THOMAS
BY
Fryer & Johnson
ATTORNEYS

TAPE ADVANCER FOR AUTOMATIC TELEPHONE DIALER

Filed Aug. 16, 1957 3 Sheets-Sheet 3

INVENTORS
JAMES KILBURG
WILLIAM E. THOMAS
BY
Fryer & Johnson
ATTORNEYS

United States Patent Office 2,999,133
Patented Sept. 5, 1961

2,999,133

TAPE ADVANCER FOR AUTOMATIC TELEPHONE DIALER

James Kilburg, San Carlos, and William E. Thomas, San Francisco, Calif., assignors to James Kilburg Corporation, San Mateo, Calif., a corporation of California Filed Aug. 16, 1957, Ser. No. 678,625
12 Claims. (Cl. 179—90)

This invention relates to telephone dialing equipment and particularly to means to effect dialing separately coded groups of numbers in predetermined succession.

The invention may be applied, for example to an automatic telephone dialer such as that shown in the Kilburg Patent No. 2,656,417 and other similar devices and will be described in its application to such a machine. The ensuing brief description of the operation of such a machine and certain limitations thereof will facilitate an understanding of the invention as it is disclosed herein.

In the machine of the patent referred to, an advanceable tape of paper-like form bears coded information in lines or spaces which are arranged transversely of its length. By adjusting the tape lengthwise any single line of such coded information may be brought into juxtaposition with a decoding mechanism. Each code line represents a telephone number and the tape also bears the name of the persons or places represented by the coded numbers to enable the tape to be positioned for making any desired call.

When a coded line is properly positioned with respect to the number to be called, the operation of the machine is initiated as by depression of a button or key and a set of electric impulses comparable to those created in the operation of a conventional telephone dial is created.

The usual local telephone number comprises seven digits, the first two of which are customarily designated by letters and remaining five by numerals. To effect the calling of any number of more than seven digits would, therefore, be expected to entail widening of the tape and corresponding enlargement of the decoding mechanism and other parts of the machine. Such a modification of this type of device entails considerable cost and undesirably increases the overall size. There are, however, instances where more than seven digits must be dialed.

For example where telephones are employed for private or interoffice dialing as well as for dialing through a public exchange, it is customary to dial one or more numbers to obtain a connection with the public exchange and then proceed with dialing in the usual manner. The number or numbers used to obtain connection with the outside or public exchange are sometimes known as a directing code for outside calls and will be referred to herein as an outside call code. Another example is the case of long distance dialing where an access code or an area code or both must be dialed to obtain communication with a distant exchange before a local number of the distance exchange is dialed.

According to the present invention such outside calling and long distance dialing is programmed or accomplished by placing on the code tape in one line the preliminary number in code required to obtain the outside exchange whether it be local or long distance. The local number is coded on the next adjacent position or line on the tape and the invention includes means to advance the tape automatically to the second line upon completion of the decoding and dialing of the coded information on the first line. Thus the second or local number can be immediately called.

The fact must also be considered that in outside call dialing as well as in some long distance dialing the first number dialed simply establishes connection with the outside or long distance exchange. The party calling then awaits the usual dial tone from that exchange before dialing the local code. The procedure therefore with the present invention is to depress the dialing key of the automatic dialer, listen for a dial tone, and depress the same key again. Meanwhile the tape has been advanced and the second depression of the key effects dialing of the local number in the area being called.

On the other hand much long distance dialing may be done by dialing an access code or an area code or both and immediately dialing the local number without hesitation or waiting for a dial tone. This direct distance dialing is also provided for in the present invention as follows. The access or area code or both, usually three digits each, are arranged on one line of the tape and the local code in the area to be called is arranged on the next line. When the dialer is actuated, as by depression of its dialing key, the invention effects dialing of the code on the first line, advancing of the tape, and then dialing of the code on the second line automatically and without necessity of depressing the dialing key again.

Whether the machine dials continuously from one line on the tape to the next or whether it hesitates between lines for a dial tone and a second actuation of the dialing mechanism is determined by a simple single code symbol on the tape. Furthermore the operation of a dialer with the present invention is not confusing to a person making a call who need not even know whether the number being called requires waiting for a dial tone. The person calling a number, having once positioned the tape to expose the name of the party to be called, simply actuates the dialer in the usual manner. If a second dial tone is heard he actuates the dialer again in exactly the same manner. If the second dial tone is not heard the call will be completed automatically.

Since, as stated, a simple code symbol on the tape directs the machine to advance the tape and either hesitate for a dial tone or continue dialing the next line, any number of lines may be dialed in automatic succession in either manner. Thus on a private exchange with an outside call code a long distance call may be programmed as follows. The first line on the tape bears the code to obtain an outside line or the public exchange and the tape is coded to advance and await a dial tone. The second line on the tape is coded to dial the access and area numbers and to advance the tape either with or without hesitation, and the third line is coded to dial the party being called. This, of course, can be continued to other lines on the tape should a condition arise where it becomes desirable to do so.

It is, therefore, the object of the present invention to provide tape advancing means for an automatic telephone dialer which will fulfill all of the above mentioned requirements and which will, in response to a simple code symbol on the tape effect automatic advancing of the tape after a dialing operation. A further object of the invention is to provide a tape advancing means for a dialer which will, in response to a different code symbol on the tape, effect advancing of the tape and then automatically initiate a second dialing operation with the tape in its new position.

The manner in which these objects are accomplished, as well as other objects and advantages of the invention are made apparent in the following specification wherein reference is made to the accompanying drawings.

The invention is illustrated and described herein in its application to an automatic dialer of the kind disclosed in the patent referred to above wherein a tape is coded by means of perforations and wherein the specific locations of the perforations are sensed by dogs which pass through them and act as control members for a clutch in a drive mechanism which actuates an impulse creating mechanism. There are, however, other types of code symbols applicable to dialer tapes such as areas sensitive to light, electric current, magnetic flux and the like and the present invention is equally well adapted to advancing tapes with such symbols as will be apparent from the following specification.

Generally speaking, the foregoing objects are accomplished by a sensing finger which is advanced toward the tape after each dialing cycle of the machine or, more specifically, on the reset cycle.

If the tape is imperforate and stops the sensing finger the machine comes to rest. A perforation in the tape allows further motion of the sensing finger which conditions a linkage to advance the tape. If the perforation is larger the finger is allowed to travel an even greater distance to condition other linkage to initiate a new cycle of operation to dial the code at the advanced position of the tape. To facilitate an understanding of these mechanisms only those portions of a telephone dialer are illustrated which are essential to such understanding.

Figure 1:
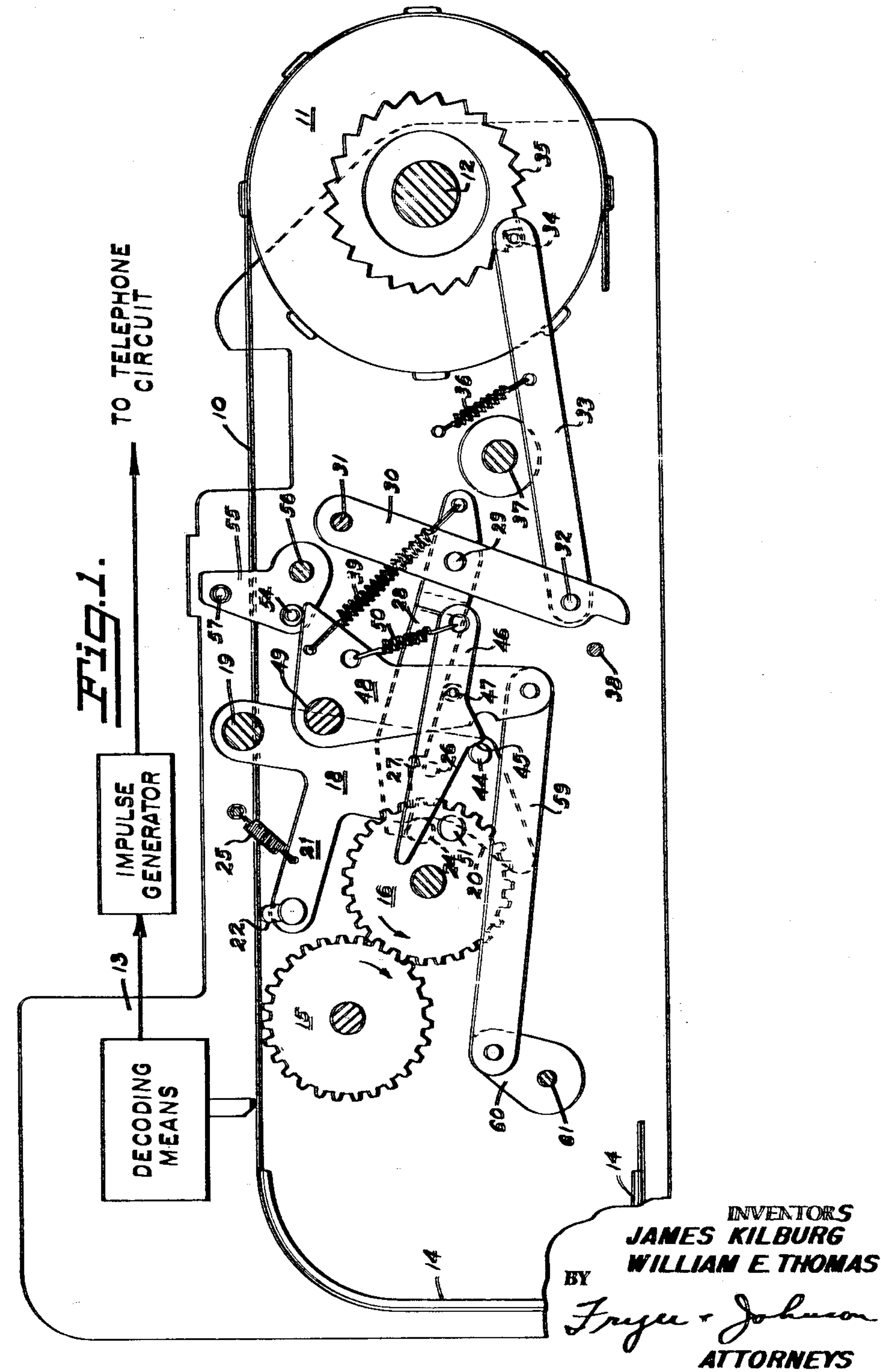
FIG. 1 is a view in side elevation of tape advancing and cycle starting mechanism embodying the present invention viewed from one side of a portion of a telephone dialing machine, the near side frame being removed and only those other portions of the machine essential to an understanding of the invention being illustrated.

Referring first to FIG. 1 of the drawings, the code tape of an automatic telephone dialer is illustrated at 10 as trained over a control drum 11 rotatably supported by a shaft 12 journalled between opposite side frames of the machine. The far side frame is shown in outline at 13 and the near side frame to which principal parts of the mechanism to be described are pivoted is removed for the sake of clarity. The tape 10 extends in a horizontal plane throughout the major portion of the length of the machine and is trained over a curved guide plate 14 and the ends of the tape are carried on suitable spool mechanism not shown which permits it to be advanced or retracted by rotation of the drum 11 in order to bring any coded line thereon into register with the decoding mechanism of the machine also omitted from the present drawing.

The power for actuating the mechanism of the present invention is taken from the machine itself in its reset cycle which occurs at the end of each dialing operation of the machine. The reset mechanism of the machine includes a gear 15 which makes a complete revolution in a clockwise direction as viewed in FIG. 1 for each reset operation. The present invention includes a main drive member or gear 16 meshing with the gear 15 and which is thus rotated once in a counter-clockwise direction thereby.

Figure 2:
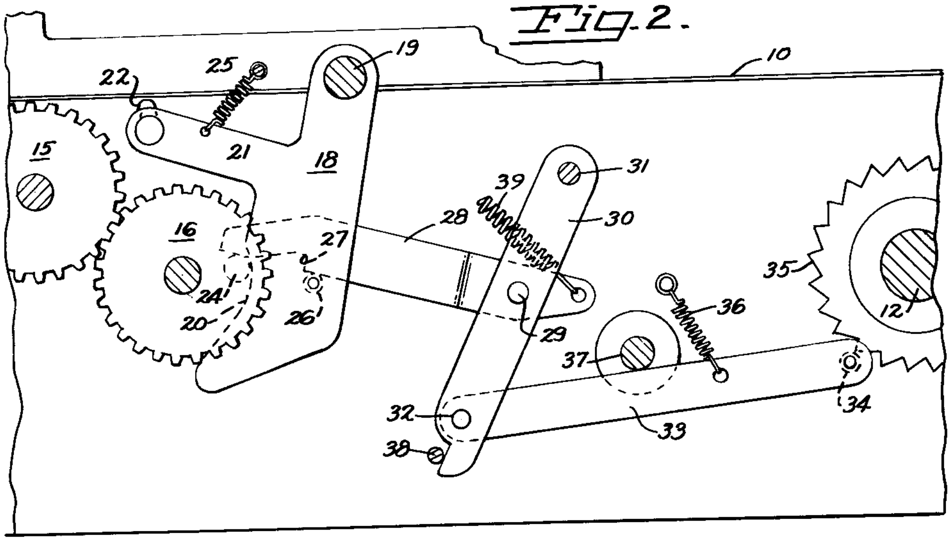
FIG. 2 is a fragmentary view of those portions of the mechanism illustrated in FIG. 1 which pertain to advancing the tape.
Figure 3:
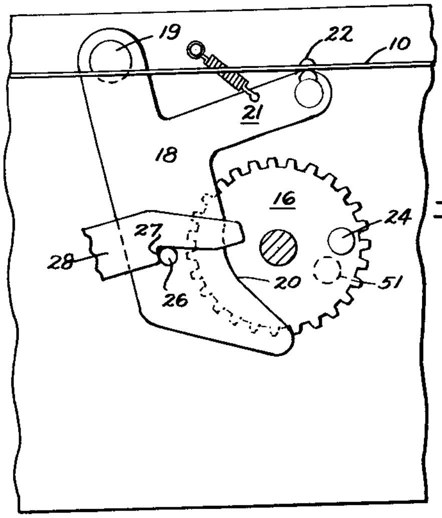
FIG. 3 is a fragmentary view from the opposite side of a part of the same mechanism.

The parts of the mechanism which effect advancing of the tape after a dialing or upon a reset operation of the machine are best shown in FIGS. 1, 2 and 3. They comprise a pivoted lever 18 depending from its pivotal support 19 and having a cam surface 20 and an arm 21 which carries a sensing finger 22 normally disposed directly beneath one edge of the tape 10. Each time the gear 16 rotates, a pin 24 thereon normally engaging the cam surface 20, as shown in FIGS. 1 and 2, leaves this cam surface and permits a spring 25 to swing the lever 18 in a clockwise direction bringing the sensing finger against the underside of the tape or, if the tape is perforated at the point of contact by the sensing finger, permitting it to enter through the tape and effect further clockwise motion of the lever 18. The lever 18 carries a pin 26 engageable with a notch 27 in a push arm 28 which is pivoted as at 29 to a lever 30 depending from a pivotal support 31. The lower end of the lever 30 is pivotally connected as at 32 to an elongated pawl 33. This pawl has a pin 34 at its forward end engageable with the teeth of a ratchet 35 fixed to the side of the tape advancing drum 11. A spring 36 normally urges the pawl upwardly and toward engagement with the ratchet and a stop 37 limits its upward movement.

In FIG. 1, the gear 16 is shown in its normal or rest position and the push arm 28, lever 30 and pawl 33 are shown in a position assumed at the instant after the drum has been advanced. In this view the members 28, 30 and 33 are ready to return to their normal position shown in FIG. 2 under the influence of a spring 39 engaging the push arm 28 and urging it and the lever 30 toward the left against a stop pin 38 to the normal position illustrated in FIG. 2.

Starting from this position and referring to FIG. 2, a counter-clockwise rotation of the gear 16 causes the pin 24 to lift the push arm by engagement with its nose. It also permits the clockwise swinging or sensing movement of the lever 18. If the sensing finger 22 engages the tape at an imperforate point, the motion of the lever 18 is limited. However, if the tape is perforated, the end of the sensing finger will pass through the perforation and the push arm 28 will drop to a position where its notch 27 embraces the pin 26 as shown in FIG. 3. Thus as the gear 16 is completing its rotation, the pin 24 engages the cam surface 20 on the lever 18, swinging the lever in a counter-clockwise direction and, through the pin 26 and push arm 28, also swinging the lever 30 and actuating the pawl 33 to advance the tape. In the event that the tape was not perforated at the point contacted by the sensing finger 22, the counter-clockwise movement of the lever 18 has no effect on the tape advancing mechanism.

Figure 6:
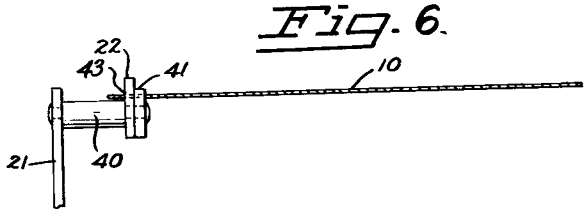
FIG. 6 is a fragmentary view in end elevation illustrating the construction of the sensing finger shown in the other views.

In order to initiate a cycle of the dialing machine, it is necessary to close the circuit to its motor and to permit engagement of its clutch, both of which acts are normally accomplished by the depression of a suitable lever or key provided on the machine for that purpose. According to the present invention, the circuit may be closed and the clutch engaged in the event of a slightly further clockwise movement of the lever 18. This necessary further movement of the lever 18 is accomplished by the shape of the sensing finger 22 and the size of the perforation in the tape. For example, the sensing finger 22 is shown in FIG. 6 as carried in spaced relation to the arm 21 by a stud 40 and the distal end of the sensing finger is shown as comprising a step 41. Thus, as illustrated in FIG. 7, a narrow code slot 42 will admit the sensing finger a short distance through the tape, as for the tape advancing operation previously described, while a wider slot, such as indicated at 43, will admit it a greater distance permitting slightly greater clockwise movement of the lever 18.

Figures 4, 5, 7:
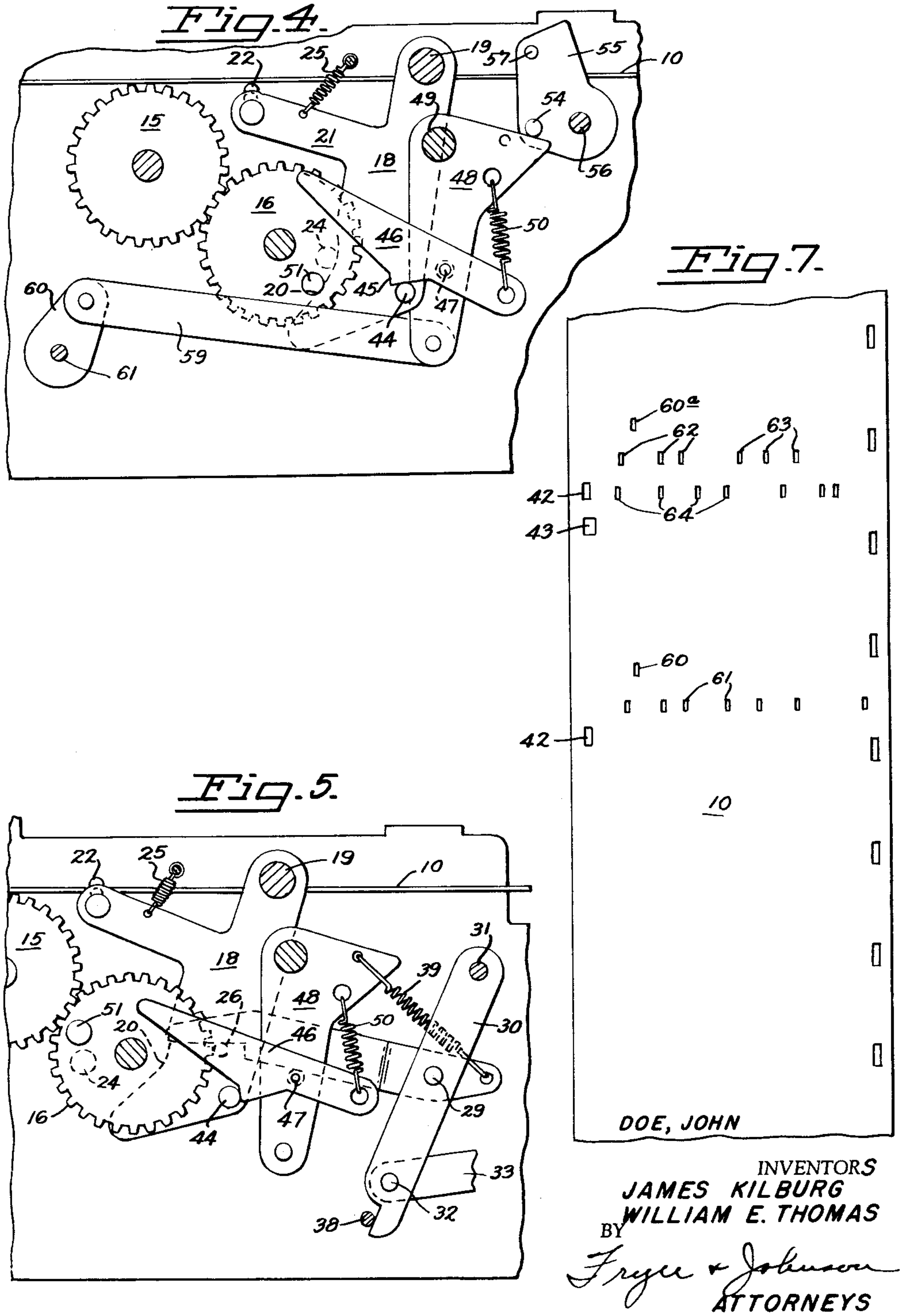
FIG. 4 is a fragmentary view of those parts of the mechanism shown in FIG. 1 which are employed in starting a new cycle of operation of the dialer.
FIG. 5 is a similar view of the same parts in a different position.
FIG. 7 is a plan view of a typical tape illustrating the arrangement of coded numbers thereon and the code perforations which control the operation of a sensing finger of the present mechanism.

The cycle starting mechanism is illustrated in FIGS. 1, 4 and 5 and comprises a pin 44 on the lever 18 engageable with a shoulder 45 on a push arm 46 which is pivoted as at 47 to a lever 48 depending from a pivotal support 49. The push arm 46 is urged to swing in a counter-clockwise direction by a spring 50. It is raised or swung in the opposite direction by a pin 51 each time that the gear rotates and during the early part of the cycle of its rotation so that before the gear completes its cycle, the push arm 46 swings downwardly permitting the pin 44 to engage its shoulder 45 in the event, and only in the event, that the lever 18 has swung clockwise the full distance permitted by the large perforation in the tape. Assuming that this engagement has taken place as illustrated in FIGS. 1 to 5, the counter-clockwise motion of the lever 18 which is imparted to it by the pin 24, as previously described, urges the push arm 46 and lever 48 in a counter-clockwise direction. Adjacent its upper end the lever 48 has a nose engageable with a pin 54 on a lever 55 which is pivotally supported at 56 and carries a pin 57 adjacent its upper end for engaging a switch (not shown) which closes a circuit to a motor of the dialing machine. Simultaneously the lower end of the lever 48 actuates a link 59 which is pivotally connected to the lever and to a crank arm 60 on a shaft 61. The shaft 61 also carries mechanism (not shown) which effects engagement of the clutch of the dialer. The lever 48 and link 59 are urged toward their normal position by the same spring 39 (see FIG. 1) which returns the tape advancing mechanism to normal.

An example of the operation of the mehcanism herein described is most easily understood by reference to FIG. 7 which shows a portion of the tape 10 with typical codes thereon for programming outside call and for programming a long distance distance call combined with an outside call. The lowermost of the two codes on the tape shows a single perforation 60 representing the digit 9 as might be used for a directing code for outside calls. Spaced a short distance from the perforation 60 and adjacent one margin of the tape is the narrow perforation 42 which, when the perforation 60 registers with the decoding mechanism of the machine, will register with the sensing finger 22 hereinabove described and will effect advancing of the tape one position or to the next adjacent line whereon a row of perforations 61 represents the telephone number to be called. Upon operation initiation of the dialing cycle of the machine will effect dialing of the number 9 and advancing the tape to the second line so that when a dial tone is heard a second actuation of the machine will effect dialing of the number coded by the perforations 61.

The example illustrated at the upper portion of the tape also shows an outside call code perforation 60*a* which registers with the decoding mechanism when the name John Doe is exposed to view in the machine. The long distance access code is represented by three perforations 62 on the next line and the area code by perforations 63 on the same line. The code on the next line represented by the perforations 64 is the code for the local telephone number of John Doe. In operation, the calling party depresses a starting key which effects dialing of the number 9 and advancing of the tape with a hesitation to await a dial tone before the access and area codes are dialed. Since the wide perforation 43 is in register with the sensing finger 22 when the access and area codes are dialed, their dialing is immediately followed by advancing of the tape and immediate and automatic dialing of the third line which contains the code of the telephone number being called.

The tape 10 is shown and referred to herein as a relatively long ribbon like member adapted to be carried on spools or reels. However much shorter tapes are used for special dialing applications and even a short card like member with dialing codes formed thereon may be used for some purposes. Therefore the term tape, as used in the appended claims is to be taken as including these various forms.

We claim:

1. For combination with a machine which includes an advanceable tape having codes representing telephone numbers arranged thereon at separated positions throughout its length, decoding means for translating information represented by said codes to impulses in a telephone circuit, and means for adjusting the tape to present separate codes thereon to the decoding means, means operable in response to a separate code symbol on the tape to advance the tape to a second code position automatically upon completion of a decoding cycle of the machine.

2. For combination with a machine which includes an advanceable tape having codes representing telephone numbers arranged thereon at separated positions throughout its length, decoding means for translating information represented by said codes to impulses in a telephone circuit, and means for adjusting the tape to present separate codes thereon to the decoding means, a sensing finger, means to move said finger against the tape after each dialing operation of the machine, and means conditioned upon further movement of said finger if it registers with a perforation in the tape, to advance the tape to a second code position after a first code has been dialed.

3. For combination with a machine which includes an advanceable tape having codes representing telephone numbers arranged thereon at separated positions throughout its length, decoding means for translating information represented by said codes to impulses in a telephone circuit, and means for adjusting the tape to present separate codes thereon to the decoding means, including ratchet and pawl means to advance the tape one code position, a sensing finger movable toward the tape after each dialing operation of the machine, and means operable in the event said finger passes through a perforation in the tape to actuate said ratchet and pawl means.

4. In a telephone dialing machine which includes an advanceable tape having codes representing telephone numbers arranged thereon at separated positions throughout its length wherein each code is arranged to be laterally read in a single scan across the direction of the tape advance, decoding means for translating information represented by said codes to impulses in a telephone circuit and means for adjusting the tape to present separate codes thereon to the decoding means, and means to initiate a decoding cycle of the machine, the improvement which comprises means responsive to a code symbol on the tape for initiating a second cycle automatically at the completion of a first cycle.

5. In a telephone dialing machine which includes an advanceable tape having codes representing telephone numbers arranged thereon at separated positions throughout its length wherein each code is arranged to be laterally read in a single scan across the direction of the tape advance, decoding means for translating information represented by said codes to impulses in a telephone circuit and means for adjusting the tape to present separate codes thereon to the decoding means, and means to initiate a decoding cycle of the machine, the improvement which comprises means responsive to a code symbol on the tape for initiating a second cycle automatically at the completion of a first cycle, said means including a finger movable into contact with the tape after each cycle to sense the presence of said code symbol.

6. In a telephone dialing machine which includes an advanceable tape having codes representing telephone numbers arranged thereon at separated positions throughout its length wherein each code is arranged to be laterally read in a single scan across the direction of the tape advance, decoding means for translating information represented by said codes to impulses in a telephone circuit and means for adjusting the tape to present separate codes thereon to the decoding means, means to initiate a decoding cycle of the machine, the improvement which comprises means responsive to a code symbol on the tape for initiating a second cycle automatically at the completion of a first cycle, said means including a finger movable into contact with the tape after each cycle to sense the presence of said code symbol, and said code symbol comprising a perforation in the tape to permit greater movement of said finger.

7. In a telephone dialing machine which includes an advanceable tape having codes representing telephone numbers arranged thereon at separated positions throughout its length wherein each code is arranged to be laterally read in a single scan across the direction of the tape advance, decoding means for translating information represented by said codes to impulses in a telephone circuit and means for adjusting the tape to present separate codes thereon to the decoding means, means to initiate a decoding cycle of the machine, the improvement which comprises means operable after each cycle of the machine in response to a code symbol on the tape to advance the tape one interval and to actuate the initiating means.

8. In a telephone dialing machine which includes an advanceable tape having codes representing telephone numbers arranged thereon at separated positions throughout its length wherein each code is arranged to be laterally read in a single scan across the direction of the tape advance, decoding means for translating information represented by said codes to impulses in a telephone circuit and means for adjusting the tape to present separate codes thereon to the decoding means, means to initiate a decoding cycle of the machine, the improvement which comprises means operable after each cycle of the machine in response to a code symbol on the tape to advance the tape one interval and to actuate the initiating means, said means including a finger movable into contact with the tape after each cycle, and said code symbol comprising a perforation in the tape to permit further movement of said finger.

9. In a telephone dialing machine which includes an advanceable tape having codes representing telephone numbers arranged thereon at separated positions throughout its length wherein each code is arranged to be laterally read in a single scan across the direction of the tape advance, decoding means for translating information represented by said codes to impulses in a telephone circuit and means for adjusting the tape to present separate codes thereon to the decoding means, means to initiate a decoding cycle of the machine, the improvement which comprises means operable after each cycle of the machine in response to a code symbol on the tape to advance the tape one interval and to actuate the initiating means, said means including a finger movable into contact with the tape after each cycle and having a step adjacent its distal end to provide a narrow end and a wider portion adjacent thereto, and said symbol comprising a narrow perforation in the tape to admit said narrow end and a wider perforation in the tape to admit said wider portion to selectively effect advancing of the tape only and advancing of the tape and initiating a new cycle.

10. In a telephone dialing machine which comprises a paper-like tape trained over a rotatable drum for adjusting the position of the tape between different data lines thereon, means to selectively advance the tape automatically from one position to the next comprising drive means, a ratchet on said drum, a pawl engageable with the ratchet, the improvement which comprises a sensing finger actuated by the drive means to move toward the tape and upon registering with a perforation therein to move beyond the tape, and means actuated upon movement of the sensing finger beyond the tape to establish a connection between the drive means and said pawl whereby the pawl will engage the ratchet and advance the drum and tape.

11. For combination with a machine which includes an advanceable tape having codes representing telephone numbers arranged thereon at separated positions throughout its length, decoding means for translating information represented by said codes to impulses in a telephone circuit, means for adjusting the tape to present separate codes thereon to the decoding means, means to facilitate decoding an outside call number on one line of the tape and a telephone number on the next line including, means to advance the tape one line, and means effective upon the presence of a separate code symbol on the tape to actuate said tape advancing means.

12. For combination with a machine which includes an advanceable tape having codes representing telephone numbers arranged thereon at separated positions throughout its length, decoding means for translating information represented by said codes to impulses in a telephone circuit, means for adjusting the tape to present separate codes thereon to the decoding means, means to facilitate decoding an outside call number on one line of the tape and a telephone number on the next line including, means to advance the tape one line, and means effective upon the presence of a separate code symbol on the tape to actuate said tape advancing means and to initiate a decoding cycle of the machine.

References Cited in the file of this patent

UNITED STATES PATENTS

| | | |
|---|---|---|
| 1,882,106 | Wise | Oct. 11, 1932 |
| 2,265,441 | Maul | Dec. 9, 1941 |
| 2,318,467 | Demeulenaere | May 4, 1943 |
| 2,324,438 | Thomas | July 13, 1943 |
| 2,426,600 | Demeulenaere | Sept. 2, 1947 |
| 2,656,417 | Kilburg | Oct. 20, 1953 |
| 2,723,312 | McGuigan | Nov. 8, 1955 |
| 2,813,931 | DeForest | Nov. 19, 1957 |